US012768725B2

(12) United States Patent
Sharma et al.

(10) Patent No.: US 12,768,725 B2
(45) Date of Patent: Oct. 20, 2026

(54) METHOD FOR DETERMINING A TEMPERATURE OF A DEPLETION LAYER OF A SEMICONDUCTOR SWITCH, AND DEVICE

(71) Applicant: Robert Bosch GmbH, Stuttgart (DE)

(72) Inventors: Kanuj Sharma, Stuttgart (DE); Ingmar Kallfass, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 257 days.

(21) Appl. No.: 18/572,285

(22) PCT Filed: May 31, 2022

(86) PCT No.: PCT/EP2022/064790
§ 371 (c)(1),
(2) Date: Dec. 20, 2023

(87) PCT Pub. No.: WO2022/268456
PCT Pub. Date: Dec. 29, 2022

(65) Prior Publication Data
US 2024/0288318 A1 Aug. 29, 2024

(30) Foreign Application Priority Data
Jun. 21, 2021 (DE) ..................... 10 2021 206 312.8

(51) Int. Cl.
*G01K 7/01* (2006.01)
*G01K 7/42* (2006.01)

(52) U.S. Cl.
CPC ............... *G01K 7/01* (2013.01); *G01K 7/427* (2013.01); *G01K 2217/00* (2013.01)

(58) Field of Classification Search
None
See application file for complete search history.

(56) References Cited

U.S. PATENT DOCUMENTS 9,683,898 B2 * 6/2017 Sundaramoorthy ..... G01K 7/01
10,903,355 B1 * 1/2021 Strzalkowski ....... H03K 17/145
(Continued)

OTHER PUBLICATIONS

Transcript of video for C2000™ configurable logic block (CLB), Dec 6, 2019, https://www.ti.com/video/series/C2000-configurable-logic-block.html#transcript-tab, accessed on Dec 18, 2025, Texas Instruments.*
(Continued)

*Primary Examiner* — Thomas J. Hiltunen
(74) *Attorney, Agent, or Firm* — Michael Best & Friedrich LLP

(57) ABSTRACT

The invention relates to a method for determining a temperature of a depletion layer of a semiconductor switch (2), wherein a first electrical voltage ($V_{S'S}$) between a source terminal (S) of the semiconductor switch (2) and a Kelvin source terminal (S') of the semiconductor switch (2) is monitored at least during a switch-on process of the semiconductor switch (2), and wherein the temperature of the depletion layer is determined in accordance with the first voltage ($V_{S'S}$). According to the invention, it is monitored whether a temperature-independent first trigger is present; it is monitored whether a temperature-dependent second trigger is present, wherein, if a first voltage ($V_{S'S}$) exceeding a predefined first threshold value ($V_{ref1}$) is detected, it is established that the second trigger is present; a first time interval, which begins when the first trigger is detected and ends when the second trigger is detected, is determined; and the temperature of the depletion layer is determined in accordance with the first time interval.

11 Claims, 3 Drawing Sheets

(56) References Cited

U.S. PATENT DOCUMENTS

| | | | | |
|---|---|---|---|---|
| 10,948,359 | B2 * | 3/2021 | Strzalkowski | H03K 17/08116 |
| 11,394,378 | B2 * | 7/2022 | Reiter | G01R 19/00 |
| 11,525,740 | B2 * | 12/2022 | Akin | G01K 7/01 |
| 2024/0291402 | A1 * | 8/2024 | Kawahara | H02M 1/0009 |

OTHER PUBLICATIONS

Translation of International Search Report for Application No. PCT/EP2022/064790 dated Sep. 26, 2022 (2 pages).

Jiang et al., "Online Junction Temperature Measurement for SiC MOSFET Based on Dynamic Threshold Voltage Extraction," IEEE Transactions on Power Electronics, 2021, vol. 36, No. 4, 3757-3768.

Luo et al., "Junction Temperature Extraction Approach With Turn-Off Delay Time for High-Voltage High-Power IGBT Modules," IEEE Transactions on Power Electronics, 2016, vol. 31, No. 7, pp. 5122-5132.

Sharma et al., "A Robust Approach for Characterization of Junction Temperature of SiC Power Devices via Quasi-Threshold Voltage as Temperature Sensitive Electrical Parameter," IEEE Applied Power Electronics Conference and Exposition, 2020, pp. 1532-1536.

Kalker et al., "Online Junction-Temperature Extraction Method for SiC MOSFETs Utilizing Turn-On Delay," IEEE 8th Workshop on Wide Bandgap Power Devices and Applications (WiPDA), 2021, pp. 378-383.

Sharma et al., "Online Junction Temperature Monitoring of Wide Bandgap Power Transistors using Quasi Turn-On Delay as TSEP," IEEE 8th Workshop on Wide Bandgap Power Devices and Applications (WiPDA), 2021, pp. 129-134.

* cited by examiner

METHOD FOR DETERMINING A TEMPERATURE OF A DEPLETION LAYER OF A SEMICONDUCTOR SWITCH, AND DEVICE

BACKGROUND

The invention relates to a method for determining a temperature of a depletion layer of a semiconductor switch, wherein a first electrical voltage between a source terminal of the semiconductor switch and a Kelvin source terminal of the semiconductor switch is monitored at least during a switch-on process of the semiconductor switch, and wherein the temperature of the depletion layer is determined as a function of the first voltage.

The invention also relates to a device for carrying out the method mentioned at the beginning.

Semiconductor switches in power electronics are exposed to enormous loads during operation of the power electronics. In order to protect the semiconductor switches from thermal overload, a temperature of the semiconductor switches or the power electronics is often determined and the power electronics are operated depending on the determined temperature.

It is known from the prior art, for example, to measure the temperature of a semiconductor switch using a thermocouple or optical methods. Although thermocouples and optical methods offer good spatial resolution with regard to temperature measurement, a suitable surface of the semiconductor switch must be accessible for the measurement. In addition, the dynamic response to temperature changes is comparatively low when using thermocouples or optical methods.

It is also known that the concentration of charge carriers in the depletion layer of a semiconductor switch changes with the temperature of the depletion layer, wherein this change also causes changes in various so-called temperature-sensitive electrical parameters (TSEP) of the semiconductor switch. For example, the switch-on delay or the switch-off delay of semiconductor switches are such temperature-dependent electrical parameters. The temperature of the depletion layer can then be determined by detecting or determining one or more TSEPs. In this regard, it is known, for example, from the publication "A Robust Approach for Characterization of Junction Temperature of SiC Power Devices via Quasi-Threshold Voltage as Temperature Sensitive Electrical Parameter" (Sharma et al., DOI: 10.1109/APEC39645.2020.9124609) to monitor a first electrical voltage between a source terminal of the semiconductor switch and a Kelvin source terminal of the semiconductor switch during a switch-on process of the semiconductor switch and to determine the temperature of the depletion layer as a function of the first voltage. This is based on the realization that the course of the first voltage correlates with the extent of the switch-on delay. Sharma et al. suggest monitoring a second voltage between a gate terminal of the semiconductor switch and the source terminal of the semiconductor switch in addition to the first voltage. A measurement time is determined depending on the first voltage. The temperature of the depletion layer is determined as a function of the voltage value of the second voltage at the time of measurement.

SUMMARY

The method according to the invention comprises the advantage that the temperature of the depletion layer of the semiconductor switch can be determined solely on the basis of the course of the first voltage. However, the detection of the second voltage or the consideration of the second voltage when determining the temperature of the depletion layer is not necessarily required. Compared to the method described in Sharma et al., this simplifies the sensor technology required to carry out the method. According to the invention, it is provided for this purpose that it is monitored whether a temperature-independent first trigger is present, that it is monitored whether a temperature-dependent second trigger is present, wherein when a first voltage exceeding a predefined first threshold value is detected, it is established that the second trigger is present, that a first time interval is determined which begins with detection of the first trigger and ends with detection of the second trigger, and that the temperature of the depletion layer is determined as a function of the first time interval. The second trigger is therefore present at the time when it is detected that the first voltage exceeds the first threshold value. This time is temperature-dependent and therefore correlates with the temperature of the depletion layer. A first trigger is provided in addition to the second trigger. The first trigger is temperature-independent and therefore serves as a fixed reference point for the temperature-dependent second trigger. Because the first trigger is temperature-independent, there is a clear correlation between the temperature of the depletion layer and the determined first time interval. According to the invention, the first voltage is monitored at least during a switch-on process of the semiconductor switch. Preferably, the first voltage is also monitored outside the switch-on process. It is assumed that the switch-on process begins when the gate terminal is activated. The switch-on process therefore begins as soon as a control signal is applied to the gate terminal in order to conductively switch the semiconductor switch. The application of a Kelvin source is known from the prior art, particularly for fast-switching semiconductor switches. A Kelvin source, which is also referred to as an auxiliary source, is electrically connected to a gate driver circuit assigned to the semiconductor switch on the one hand and a Kelvin point of a load path of the semiconductor switch on the other.

According to a preferred embodiment, it is provided that the gate driver circuit assigned to the semiconductor switch provides the first trigger. For example, the gate driver circuit provides information regarding the time from which the gate driver circuit activates the gate terminal as the first trigger. This time is determined by the gate driver circuit and is therefore temperature-independent. This embodiment of the method is advantageous in that the first trigger does not have to be detected by measurement. Preferably, the gate driver circuit provides the first trigger of an evaluation unit that is designed to determine the temperature of the depletion layer.

According to an alternative embodiment, it is provided that, depending on the first voltage, it is established that the first trigger is present. The first voltage is therefore monitored for the occurrence of a temperature-independent event, wherein when this event is detected it is established that the first trigger is present.

According to a preferred embodiment, it is provided that a second threshold value is predefined and that when a first voltage below the second threshold value is detected, it is established that the first trigger is present. When the control signal is applied to the gate terminal of the semiconductor switch, the electrical gate current of the semiconductor switch increases. The increase in gate current causes a reduction in the first voltage, which is independent of temperature.

According to a preferred embodiment, it is provided that the second electrical voltage between the gate terminal of the semiconductor switch and the source terminal of the semiconductor switch is monitored, and that the temperature of the depletion layer is determined as a function of the second voltage detected at the end of the first time interval. The voltage value of the second voltage that is present at the time at which the second trigger is detected is therefore also taken into account. The additional consideration of the second voltage increases the accuracy and robustness of the method.

According to a preferred embodiment, it is provided that the first voltage is monitored during a switch-off process of the semiconductor switch, that it is monitored whether a temperature-independent third trigger is present, that it is monitored whether a temperature-dependent fourth trigger is present, wherein upon detection of a first voltage falling below a predefined third threshold value, it is established that the fourth trigger is present, that a second time interval is determined which begins with detection of the third trigger and ends with detection of the fourth trigger, and that the temperature of the depletion layer is determined as a function of the second time interval. A switch-off process of the semiconductor switch is started by interrupting the activation of the semiconductor switch. The switch-off process therefore begins when the gate terminal is no longer supplied with the control signal. According to this embodiment of the method, additional information correlating with the temperature of the depletion layer, namely the second time interval, is determined during the switch-off process. As mentioned at the beginning, in addition to the switch-on delay, the switch-off delay is also a temperature-dependent electrical parameter of the semiconductor switch. The additional consideration of the second time interval when determining the temperature of the depletion layer further increases the accuracy and robustness of the method. In addition, the same sensor technology can be used that is also used to determine the first time interval. Preferably, the gate driver circuit provides the third trigger. Alternatively, it is preferably established that the third trigger is present depending on the first voltage. For example, a fourth threshold value is predefined for this purpose and it is established that the third trigger is present when a first voltage exceeding the fourth threshold value is detected.

Preferably, an electrical load current flowing through the semiconductor switch is monitored and the temperature of the depletion layer is determined as a function of the load current, in particular as a function of a plateau current value of the load current. This is based on the knowledge that the switch-on delay and the switch-off delay correspond to the level of the load current. In this respect, taking the load current into account when determining the temperature of the depletion layer increases the accuracy with regard to temperature determination.

The temperature of the depletion layer is preferably calculated. In particular, a matrix-based calculation instruction is predefined and the temperature of the depletion layer is calculated according to the calculation instruction. This also includes determining the temperature of the depletion layer. Preferably, the temperature is calculated as a function of at least one coefficient stored in a lookup table.

The device according to the invention for determining a temperature of a depletion layer of a semiconductor switch comprises an evaluation unit and a sensor unit for monitoring a first electrical voltage between a source terminal of the semiconductor switch and a Kelvin source terminal of the semiconductor switch. The device is characterized by the features of the disclosure in that it is specifically configured to carry out the method according to the invention when used as intended by means of the sensor unit and the evaluation unit. The advantages specified hereinabove also result thereby. Further preferred features and feature combinations result from the description as well as the claims.

Preferably, the evaluation unit is designed as a microcontroller. Such an evaluation unit is particularly suitable for determining or calculating the temperature of the depletion layer of the semiconductor switch as a function of various parameters.

Preferably, the evaluation unit comprises at least one flip-flop circuit. An electronic circuit of this type comprises two stable states with regard to its output signal and is therefore also referred to as a bi-stable switching element. Preferably, the flip-flop circuit is connected downstream of a comparator of the evaluation unit. The flip-flop circuit prevents a particular trigger from being detected multiple times during a switch-on or switch-off process of the semiconductor switch. Preferably, the flip-flop circuit is designed as a D flip-flop circuit.

BRIEF DESCRIPTION OF THE DRAWINGS

The invention is explained in more detail below with reference to the drawings. The figures show.

DETAILED DESCRIPTION

Figure 1:
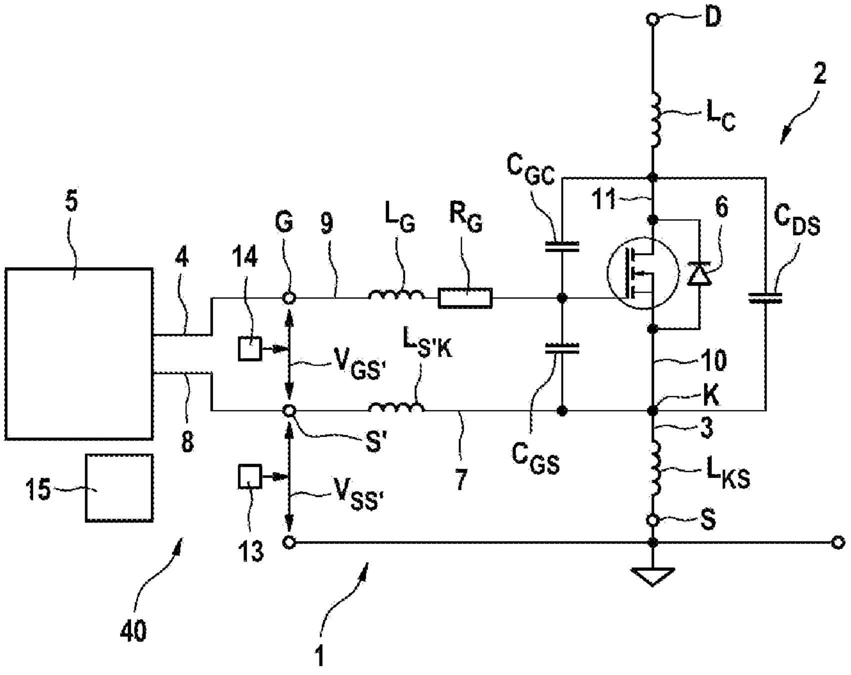
FIG. 1 an electrical circuit with a semiconductor switch.

FIG. 1 shows an electrical circuit 1 with a semiconductor switch 2. The semiconductor switch 2 comprises a source terminal S and a drain terminal D. The source terminal S is electrically connected to the drain terminal D via an electrical load path 3 of the semiconductor switch 2. An electric current flowing through load path 3 is referred to as load current $I_D$.

The semiconductor switch 2 also comprises a gate terminal G. The gate terminal G is electrically connected to a gate of the semiconductor switch 2 via a gate path 9. The gate terminal G is also electrically connected to a gate driver circuit 5 via a first control path 4. The gate driver circuit 5 is designed to apply a PWM control signal, in particular a pulse width modulated control signal, to the gate terminal G by means of the first control path 4.

The semiconductor switch 2 also comprises a depletion layer, which is arranged in the load path 3 in such a way that a current flow through the load path 3 is either blocked or enabled by the depletion layer. If the PWM control signal is applied to the gate terminal G by the gate driver circuit 5, the depletion layer is or becomes conductive, so that the load path 3 is then enabled and the load current $I_D$ can flow through the load path 3. However, if the PWM control signal is not applied to the gate terminal G, the depletion layer is or becomes non-conductive, so that the load path 3 is then blocked.

The semiconductor switch 2 also comprises a diode 6, which is connected in parallel to the depletion layer and conducts in the direction of the drain terminal D.

The load path 3 comprises a Kelvin point K between the source terminal S on the one hand and the depletion layer on the other. The Kelvin point K is electrically connected to a Kelvin source terminal S' of the semiconductor switch 2 via a Kelvin path 7. The Kelvin source terminal S' is also electrically connected to the gate driver circuit 5 via a second control path 8.

The load path 3 comprises an inductance Lks between the Kelvin point K and the source terminal S. In addition, the load path 3 between the depletion layer and the drain terminal D comprises an inductance $L_C$. The Kelvin path 7 comprises an inductance of $L_{S'K}$. The gate path 9 comprises an inductance $L_G$ and a resistance $R_G$.

The gate path 9 is capacitively coupled to a section 10 of the load path 3 assigned to the source terminal S. This is illustrated in FIG. 1 by a capacitor $C_{GS}$. The gate path 9 is also capacitively coupled to a section 11 of the load path 3 assigned to the drain terminal D. This is illustrated in FIG. 1 by a capacitor $C_{GC}$. The section 10 of the load path 3 assigned to the source terminal S is capacitively coupled to the section 11 of the load path 3 assigned to the drain terminal D. This is illustrated in FIG. 1 by a capacitor $C_{DS}$.

Circuit 1 also comprises a device 40. The device 40 comprises a first sensor unit 13. The first sensor unit 13 is designed to monitor a first electrical voltage $V_{S'S}$ between the source terminal S and the Kelvin source terminal S'. The device 40 also comprises a second sensor unit 14. The second sensor unit 14 is designed to monitor a second electrical voltage $V_{GS'}$ between the gate terminal G and the Kelvin source terminal S'.

The device 40 also comprises an evaluation unit 15. The evaluation unit 15 is connected to the first sensor unit 13 and the second sensor unit 14 for communication purposes. The sensor units 13 and 14 provide the evaluation unit 15 with their sensor signal. The evaluation unit 15 is designed to determine the temperature of the depletion layer. This is explained in more detail below with reference to FIGS. 2 and 3.

Figure 2:
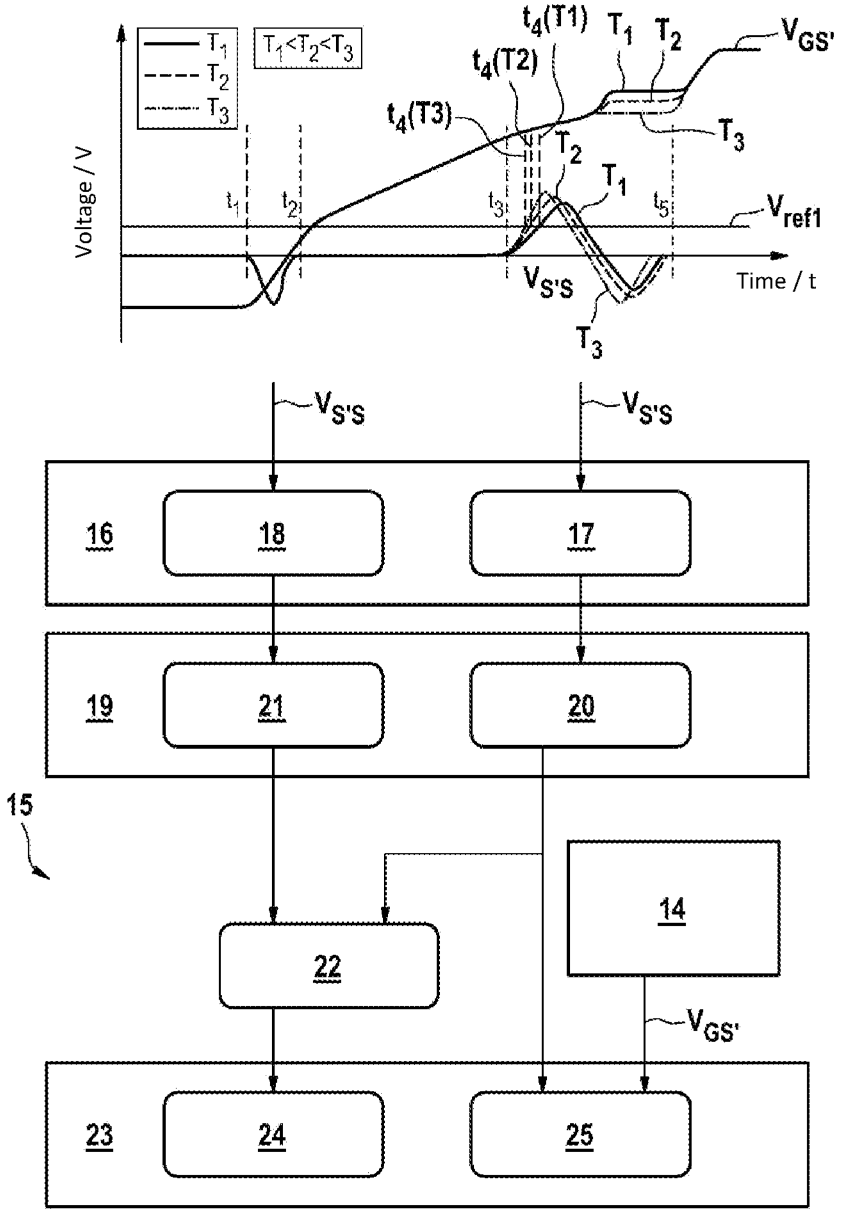
FIG. 2 a method for determining a temperature of a depletion layer of the semiconductor switch according to a first embodiment example and FIG. 3 the method according to a second embodiment example.

FIG. 2 shows a method for determining the temperature of the depletion layer according to a first embodiment example. The upper part of FIG. 2 shows the course of the first voltage $V_{S'S}$ and the course of the second voltage $V_{GS'}$ during a switch-on process at three different temperatures T1, T2 and T3 of the depletion layer. The lower part of FIG. 2 shows the evaluation unit 15.

As can be seen in FIG. 2, the evaluation unit 15 comprises a comparator stage 16 with a first comparator 17 and a second comparator 18. The first comparator 17 compares the first voltage $V_{S'S}$ with a predefined first threshold value $V_{ref1}$. If the first voltage $V_{S'S}$ exceeds the first threshold value $V_{ref1}$, the first comparator 17 establishes that a second trigger is present. The second comparator 18 compares the first voltage $V_{S'S}$ with a predefined second threshold value. In this case, the second threshold value is only slightly below the time axis so that the second threshold value is not visible in FIG. 2. If the first voltage $V_{S'S}$ falls below the second threshold value, the second comparator 18 establishes that a first trigger is present.

A holding stage 19 with a first flip-flop circuit 20 and a second flip-flop circuit 21 is connected downstream of the comparator stage 16. The flip-flop circuits 20 and 21 are D flip-flop circuits. The first comparator 17 activates the first flip-flop circuit 20 when it establishes that the second trigger is present. The second comparator 18 activates the second flip-flop circuit 21 when it establishes that the first trigger is present.

A time-to-digital converter 22 is connected downstream of the flip-flop circuits 20 and 21. An evaluation stage 23 with a first evaluation circuit 24 and a second evaluation circuit 25 is connected downstream of the time-to-digital converter 22. If the first flip-flop circuit 20 is activated, the time-to-digital converter 22 provides the first evaluation circuit 24 with a first digital time information relating to the activation of the first flip-flop circuit 20. If the second flip-flop circuit 21 is activated, the time-to-digital converter 22 provides the first evaluation circuit 24 with a second digital time information relating to the activation of the second flip-flop circuit 21. The first evaluation circuit 24 is designed to determine a first time interval as a function of the two digital time information, which begins with the detection of the first trigger and ends with the detection of the second trigger.

With reference to the upper part of FIG. 2, the course of the first voltage $V_{S'S}$ and the course of the second voltage $V_{GS'}$ are explained in more detail below. At a first time $t_1$, the gate driver circuit 5 controls the gate terminal G. A PWM control signal is therefore applied to the gate terminal G from the first time $t_1$. As a result, the second voltage $V_{GS'}$ increases from the first time $t_1$ and an electrical gate current $I_G$ flows through the gate path 9. The increase in the gate current $I_G$ causes a drop in the first voltage $V_{S'S}$. The second threshold value is predefined in such a way that the second comparator 18 establishes that the first trigger is present at approximately the first time $t_1$. The drop in the first voltage $V_{S'S}$ following the first time $t_1$ is at least essentially independent of the temperature of the depletion layer of the semiconductor switch 2. In this respect, the first trigger is a temperature-independent trigger.

From a second time $t_2$, the gate current $I_G$ is at least essentially constant, so that the first voltage $V_{S'S}$ from the second time $t_2$ comprises approximately the same value as before the first time $t_1$.

From a third time $t_3$, the load current $I_D$ increases. This causes an increase in the first voltage $V_{S'S}$. The increase correlates with the temperature of the depletion layer of the semiconductor switch 2. At a fourth point in time $t_4$, the first voltage $V_{S'S}$ exceeds the first threshold value $V_{ref1}$. Accordingly, the first comparator 17 establishes at the fourth time $t_4$ that the second trigger is present. As can be seen from FIG. 2, the voltage $V_{S'S}$ exceeds the first threshold value $V_{ref1}$ earlier at lower temperatures than at higher temperatures. The time $t_4$(T3) at the highest temperature T3 is before the time $t_4$(T2) at the average temperature T2. Time $t_4$(T2) at the average temperature T2 is before time $t_4$(T1) at the lowest temperature T1. Accordingly, the first comparator 17 establishes the presence of the second trigger at different times depending on the temperature of the depletion layer. The second trigger is therefore temperature-dependent. Accordingly, the first time interval is also temperature-dependent.

From a fifth time $t_5$, the first voltage $V_{S'S}$ corresponds at least essentially to the output voltage, i.e. the voltage before the first time $t_1$.

The course of the first voltage $V_{S'S}$ during a switch-on process of the semiconductor switch 2 is described at different times t by the following formulae:

$$V_{S'S} = \begin{cases} V_{S'K} = -L_{S'K}\frac{dI_G}{dt}, & t_1 < t \le t_2 \\ V_{S'K} \approx V_{KS} = 0, & t_2 < t \le t_3 \\ V_{KS} = L_{KS}\frac{dI_D}{dt}, & t_3 < t \le t_5 \end{cases}$$

The second evaluation circuit 25 is connected downstream of the first flip-flop circuit 20. In addition, the second evaluation circuit 25 is connected on the input side to the second sensor unit 14. The second evaluation circuit 25 is designed to select the voltage value of the second voltage $V_{GS'}$ that is detected at the time at which it is established that the second trigger is present. The voltage value of the second voltage $V_{GS'}$ that is detected or present at the end of the first time interval is therefore selected. As can be seen from FIG. 2, this voltage value is also dependent on the temperature of the depletion layer. The later it is established that the second trigger is present, the higher the voltage value of the second voltage $V_{GS'}$.

The evaluation stage 23 is designed to determine the temperature of the depletion layer as a function of the first time interval on the one hand and the voltage value of the second voltage $V_{OS'}$ at the end of the first time interval on the other. In addition, evaluation stage 23 also takes into account the current value of the load current I, because the course of the first voltage $V_{S'S}$ correlates with the load current $I_D$. For example, the evaluation stage 23 takes into account the plateau current value of the load current $I_D$ in the switched-on state of the semiconductor switch 2 as the current value of the load current $I_D$. Accordingly, there is also a sensor unit that is designed to detect the load current $I_D$ and provide the detected load current $I_D$ to the evaluation stage 23. In this case, evaluation stage 23 calculates the temperature of the depletion layer according to the following calculation instructions:

$$\varphi_{TSEP1} = t^{q}_{d,on} = a_{11} \cdot T_j + a_{12} \cdot I_D + b_1$$

$$\varphi_{TSEP2} = V^{q}_{th} = a_{21} \cdot T_j + a_{22} \cdot I_D + b_2$$

$$\begin{bmatrix} \varphi_{TSEP1} \\ \varphi_{TSEP2} \end{bmatrix} = \begin{bmatrix} a_{11} & a_{12} \\ a_{21} & a_{22} \end{bmatrix} \begin{bmatrix} T_j \\ I_D \end{bmatrix} + \begin{bmatrix} b_1 \\ b_2 \end{bmatrix}$$

$$\varphi_{TSEP} = A\hat{\psi} + B \quad (1)$$

$$\hat{\psi} = A^{-1}(\varphi_{TSEP} - B) \quad (2)$$

Here, $\varphi_{TSEP1}$ and $\varphi_{TSEP2}$ describe the first time interval and the voltage value of the second voltage VGS' at the end of the first time interval. The parameters $a_{11}$, $a_{12}$, $b_1$, $a_{21}$, $a_{22}$ and $b_2$ describe coefficients determined in preliminary tests and stored in a lookup table. $T_j$ describes the temperature of the depletion layer. $\hat{\psi}$ if describes a pair of values formed by the temperature of the depletion layer and the current value of the load current $I_D$.

According to a further embodiment example, the evaluation unit 14 or the evaluation stage 23 determines the temperature of the depletion layer only as a function of the first time interval. The voltage value of the second voltage $V_{GS'}$ at the end of the first time interval is accordingly not taken into account according to this embodiment example.

Figure 3:
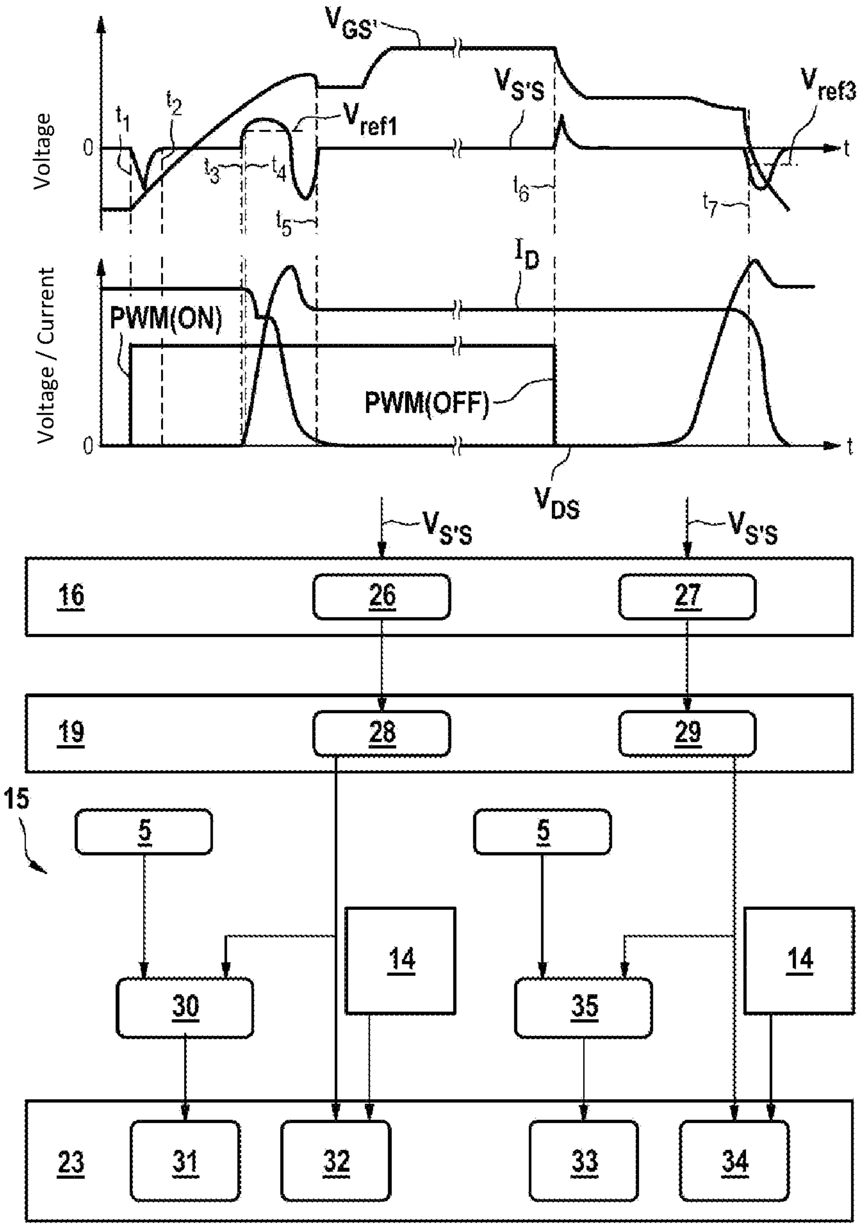

FIG. 3 shows the method according to a further embodiment example. The upper part of FIG. 3 shows the course of the first voltage $V_{S'S}$, the course of the second voltage $V_{GS'}$, the course of the load current $I_D$, the course of a third voltage $V_{DS}$ between the drain terminal D the course of the load current $I_D$, the course of a third voltage $V_{DS}$ between the drain terminal D and the source terminal S and the control signal PWM. FIG. 3 shows the course of the above variables during a switch-on process of the semiconductor switch 2 and a subsequent switch-off process. With regard to the times $t_1$ to $t_5$, reference is made to the explanations of the embodiment example shown in FIG. 2.

As can be seen from FIG. 3, the evaluation unit 15 also comprises a comparator stage 16 according to this embodiment example. The comparator stage 16 comprises a first comparator 26 and a second comparator 27. The first comparator 26 compares the first voltage $V_{S'S}$ with the predefined first threshold value $V_{ref1}$, analogous to the first comparator 17 of the embodiment example shown in FIG. 2. If the first voltage $V_{S'S}$ exceeds the first threshold value $V_{ref1}$, the first comparator 26 establishes that the second trigger is present. According to the embodiment example shown in FIG. 3, the first voltage $V_{S'S}$ also exceeds the first threshold value $V_{ref1}$ at the fourth time $t_4$. Accordingly, the first comparator 26 establishes at the fourth time $t_4$ that the second trigger is present. The second comparator 27 compares the first voltage $V_{S'S}$ with a predefined third threshold value $V_{ref3}$. If the first voltage $V_{S'S}$ falls below the third threshold value $V_{ref3}$, the second comparator 27 establishes that a fourth trigger is present. The time at which the first voltage $V_{S'S}$ falls below the third threshold value $V_{ref3}$ correlates with the temperature of the depletion layer of the semiconductor switch 2. In this respect, the fourth trigger is temperature-dependent. According to the embodiment example shown in FIG. 3, the first voltage $V_{S'S}$ falls below the third threshold value $V_{ref3}$ at a seventh time $t_7$, so that the fourth trigger is present at the seventh time $t_7$.

A holding stage 19 is also connected downstream of the comparator stage 16 according to the embodiment example shown in FIG. 3. The holding stage 19 comprises a first flip-flop circuit 28 and a second flip-flop circuit 29. The first comparator 26 activates the first flip-flop circuit 28 when it establishes that the second trigger is present. The second comparator 27 activates the second flip-flop circuit 29 when it establishes that the fourth trigger is present.

A first time-to-digital converter 30 is connected downstream of the first flip-flop circuit 28. A first evaluation circuit 31 of the evaluation stage 23 is connected downstream of the first time-to-digital converter 30. According to the embodiment example shown in FIG. 3, the evaluation stage 23 comprises the first evaluation circuit 31, a second evaluation circuit 32, a third evaluation circuit 33 and a fourth evaluation circuit 34.

The first time-to-digital converter 30 is also connected to the gate driver circuit 5 on the input side. If the gate driver circuit 5 applies the PWM control signal to the gate terminal G, the gate driver circuit 5 provides the temperature-independent first trigger to the first time-to-digital converter 30. According to the embodiment example shown in FIG. 3, the gate driver circuit 5 applies the PWM control signal to the gate terminal G from the first time $t_1$. Accordingly, the first trigger is ready at the first time $t_1$. The first time-to-digital converter 30 provides the first evaluation circuit 31 with a first digital time information correlating with the first trigger. If the first flip-flop circuit 28 is activated, the first time-to-digital converter 30 of the first evaluation circuit 31 provides a second digital time information correlating with the activation of the first flip-flop circuit 28. The first evaluation circuit 31 is designed to determine the first time interval, which begins with the detection of the first trigger and ends with the detection of the second trigger, as a function of the two digital time information.

The second evaluation circuit 32 is connected downstream of the first flip-flop circuit 28. In addition, the second evaluation circuit 32 is connected on the input side to the second sensor unit 14. The second output circuit 32 is adapted to select the voltage value of the second voltage $V_{GS'}$ which is detected at the time when it is established that the second trigger is present. This corresponds to the design of the second evaluation circuit 25 of the embodiment example shown in FIG. 2.

A second time-to-digital converter 35 is connected downstream of the second flip-flop circuit 29. The third evaluation circuit 33 is connected downstream of the second time-to-digital converter 35. The second time-to-digital converter 35 is also connected to the gate driver circuit 5 on the input side. If the gate driver circuit 5 stops controlling the semiconductor switch 2, i.e. if the control signal PWM is no longer applied to the gate terminal G, the gate driver circuit 5 provides the second time-to-digital converter 35 with a third trigger. According to the embodiment example shown in FIG. 3, the gate driver circuit 5 interrupts the application of the PWM control signal to the gate terminal G at a sixth time $t_6$. Accordingly, the third trigger is present at the sixth time $t_6$. The second time-to-digital converter 35 then provides the third evaluation circuit 33 with third digital time information that correlates with the third trigger.

If the second flip-flop circuit 29 is activated, the second time-to-digital converter 35 provides the third evaluation circuit 33 with fourth digital time information correlating with the activation of the second flip-flop circuit 29. The third evaluation circuit 33 is designed to determine a second time interval as a function of the two digital time information, which begins with detection of the third trigger provided by the gate driver circuit 5 and ends with detection that the first voltage $V_{S'S}$ falls below the third threshold value $V_{ref3}$.

The fourth evaluation circuit 34 is connected downstream of the second flip-flop circuit 29. In addition, the fourth evaluation circuit 34 is connected on the input side to the second sensor unit 14. The fourth evaluation circuit 34 is designed to select the voltage value of the second voltage $V_{GS'}$ which is present at the time at which it is detected that the first voltage $V_{S'S}$ falls below the third threshold value $V_{ref3}$.

According to the embodiment example shown in FIG. 3, the evaluation stage 23 is designed to determine the temperature of the depletion layer as a function of the first time interval, the second time interval and the voltage values of the second voltage $V_{GS'}$ selected by the evaluation circuits 32 and 34. In this case, evaluation stage 23 calculates the temperature of the depletion layer according to the following calculation instructions:

$$\varphi_{TSEP1} = t^q_{d,on} = a_{11} \cdot T_j + a_{12} \cdot I_D + a_{13} \cdot V_{DD} + b_1$$

$$\varphi_{TSEP2} = V^q_{th,on} = a_{21} \cdot T_j + a_{22} \cdot I_D + a_{23} \cdot V_{DD} + b_2$$

$$\varphi_{TSEP3} = t^q_{d,off} = a_{31} \cdot T_j + a_{31} \cdot I_D + a_{33} \cdot V_{DD} + b_3$$

$$\varphi_{TSEP4} = V^q_{th,off} = a_{41} \cdot T_j + a_{42} \cdot I_D + a_{43} \cdot V_{DD} + b_4$$

$$\begin{bmatrix} \varphi_{TSEP1} \\ \varphi_{TSEP2} \\ \varphi_{TSEP3} \\ \varphi_{TSEP4} \end{bmatrix} = \begin{bmatrix} a_{11} & a_{12} & a_{13} \\ a_{21} & a_{22} & a_{23} \\ a_{31} & a_{32} & a_{33} \\ a_{41} & a_{42} & a_{43} \end{bmatrix} \begin{bmatrix} T_j \\ V_{DC} \\ I_D \end{bmatrix} + \begin{bmatrix} b_1 \\ b_2 \\ b_3 \\ b_4 \end{bmatrix}$$

$$\varphi_{TSEP} = A\hat{\psi} + B \tag{3}$$

$$\hat{\psi} = A^{-1}(\varphi_{TSEP} - B) \tag{4}$$

According to this calculation instruction, the various parameters a and b also describe various coefficients determined in preliminary tests and stored in a lookup table. $\varphi_{TSEP3}$ and $\varphi_{TSEP4}$ describe the second time interval or the selected voltage value of the second voltage $V_{GS'}$ at the end of the second time interval.

According to a further embodiment example, based on the embodiment example shown in FIG. 3, it is established as a function of the first voltage $V_{S'S}$ that the first and third triggers are present. Preferably, the evaluation unit 15 then comprises corresponding comparators that are designed to compare the first voltage $V_{S'}$[g3]S[/g3] with suitable threshold values.

According to a further embodiment example, starting from the embodiment example shown in FIG. 2, applying the PWM control signal to the gate terminal G establishes that the first trigger is present.

The invention claimed is:

1. A method for determining a temperature of a depletion layer of a semiconductor switch (2), the method comprising:
- monitoring a first voltage ($V_{S'S}$) between a source terminal (S) of the semiconductor switch (2) and a Kelvin source terminal (S') of the semiconductor switch (2) at least during a switch-on process of the semiconductor switch (2) including
  - determining whether a temperature-independent first trigger is present, and
  - determining whether a temperature-dependent second trigger is present, it being established that the second trigger is present when the first voltage ($V_{S'S}$) exceeding a predefined first threshold value ($V_{ref1}$) is detected;
  - determining a first time interval which begins with a detection of the first trigger and ends with a detection of the second trigger; and
  - determining the temperature of the depletion layer as a function of the first time interval and of the first voltage ($V_{S'S}$),
- wherein it is established that the first trigger is present when the first voltage ($V_{S'S}$) falls below a second threshold value, the second threshold value being predefined.

2. The method according to claim 1, wherein a gate driver circuit (5) assigned to the semiconductor switch (2) provides the first trigger.

3. The method according to claim 1, wherein a second voltage ($V_{GS'}$) is monitored between the gate terminal (G) of the semiconductor switch (2) and the source terminal (S) of the semiconductor switch (2), and the temperature of the depletion layer is determined as a function of the second voltage ($V_{GS'}$) detected at the end of the first time interval.

4. The method according to claim 1, the method further comprising:
- monitoring the first voltage ($V_{S'S}$) during a switch-off process of the semiconductor switch (2) including
- monitoring whether a temperature-independent third trigger is present, and
- monitoring whether a temperature-dependent fourth trigger is present, it being established that the fourth trigger is present when the first voltage ($V_{S'S}$) falls below a predefined third threshold value ($V_{ref3}$);
- determining a second time interval which begins with a detection of the third trigger and ends with a detection of the fourth trigger; and
- determining the temperature of the depletion layer as a function of the second time interval.

5. The method according to claim 4, wherein the gate driver circuit (5) provides the third trigger.

6. The method according to claim 4, wherein it is established as a function of the first voltage ($V_{S'S}$) that the third trigger is present.

7. The method according to claim 1, wherein an electrical load current ($I_D$) flowing through the semiconductor switch (2) is monitored, and the temperature of the depletion layer is determined as a function of the load current ($I_D$).

8. The method according to claim 1, wherein the temperature of the depletion layer is calculated as a function of at least one coefficient stored in a lookup table.

9. A device for determining a temperature of a depletion layer of a semiconductor switch (2), wherein the device (40) comprises an evaluation unit (15) and a sensor unit (13) for monitoring a first electrical voltage ($V_{S'S}$) between a source terminal (S) of the semiconductor switch (2) and a Kelvin source terminal (S') of the semiconductor switch (2), wherein the device (40) is specifically configured to carry out the method according to claim 1.

10. The device according to claim 9, wherein the evaluation unit (15) is designed as a microcontroller (15).

11. The device according to claim 9, wherein the evaluation unit (15) comprises at least one flip-flop circuit (20, 21, 28, 29).

* * * * *